United States Patent [19]
Strano et al.

[11] Patent Number: 6,013,178
[45] Date of Patent: Jan. 11, 2000

[54] WATER FILTER AND WATER FILTER ASSEMBLY FOR ROBOTIC UNDERWATER SWIMMING POOL CLEANING MACHINES

[75] Inventors: Jerome Strano, Boynton Beach; Fernando Tages, Coral Springs, both of Fla.

[73] Assignee: Aqua-Vac Systems, Inc., West Palm Beach, Fla.

[21] Appl. No.: 09/172,825

[22] Filed: Oct. 15, 1998

[51] Int. Cl.$^7$ ................................................. B01D 21/30
[52] U.S. Cl. ...................... 210/136; 210/236; 210/323.1; 210/416.2; 210/453; 210/456; 210/493.3; 210/497.01; 15/1.7
[58] Field of Search ..................................... 210/136, 236, 210/322, 323.1, 416.2, 453, 456, 493.3, 497.01; 15/1.7; 55/324, 484, 504, 506, DIG. 3, DIG. 31

[56] References Cited

U.S. PATENT DOCUMENTS

| | | |
|---|---|---|
| 4,168,557 | 9/1979 | Rasch et al. . |
| 5,172,445 | 12/1992 | Chandler ..................................... 15/1.7 |
| 5,337,434 | 8/1994 | Erlich . |
| 5,569,371 | 10/1996 | Perling . |

*Primary Examiner*—Matthew O. Savage
*Attorney, Agent, or Firm*—Zarley, McKee, Thomte, Voorhees & Sease

[57] ABSTRACT

The water filter and water filter assembly for swimming pool cleaning machines of this invention has a hollow outer housing with a top, bottom, and sidewalls. An electrical pump motor is mounted within the outer housing and has an upper end. An output shaft on the pump motor extends upwardly therefrom and has an impeller mounted thereon which is positioned adjacent to and inwardly from a water discharge port in the top of the outer housing. The pump is positioned in spaced relationship with respect to the outer housing. An opening is located in the bottom of the outer housing to receive a water filter assembly. The filter assembly includes a filter housing which includes space U-shaped ends having top and bottom edges with an open U-shaped opening extending from the top edge and extending downwardly in the U-shaped ends towards the bottom edge thereof. The U-shaped ends have parallel side edges, and a pair of stiff rectangular filter elements are vertically mounted extending between the opposite side edges of the U-shaped ends. A U-shaped housing extends between the U-shaped ends and connects the U-shaped openings in each of the U-shaped ends. The filter housing has a removable bottom to cover the opening in the bottom of the outer housing. A router inlet port is in the removable bottom. The filter elements extend vertically from the top of the U-shaped housing member and removable bottom member to define a first compartment between the filter elements and the U-shaped housing member. A second compartment is located between the filter elements and the water discharge port.

3 Claims, 3 Drawing Sheets

WATER FILTER AND WATER FILTER ASSEMBLY FOR ROBOTIC UNDERWATER SWIMMING POOL CLEANING MACHINES

BACKGROUND OF THE INVENTION

The present invention relates to a filtering method for an automatic pool-cleaning robot.

Pool cleaning robots are self-propelled automatic units that clean by scrubbing and vacuuming the pool floors and walls. The suction created by its internal pump vacuums the debris and captures it in an internal filter. When the internal filter gets dirty, it is removed, cleaned and re-installed for re-use. The filter is usually cleaned after every use of the pool cleaner.

All commercially available pool-cleaning robots use a "bag" type internal filter. These "bag" type filters are cumbersome to remove and install. They require tie bands and/or clips and also proper folding or orientation to secure in place. The "bag" type filter is also laborious and difficult to clean because the nature of the bag requires the user to invert it "inside-out" while full of debris in order to clean it properly. A garden hose spray nozzle is used to remove the remaining fine debris from the inside of the filter bag. This spraying process is cumbersome because the bag is pliable (has no permanent shape) which makes it difficult to hold and spray clean. It is well known that most customers complain about the difficulty of cleaning the "bag" type filter.

The permeability or "flow rate" per given area and porosity of bag type filters is low and therefore requires higher power to suck the water through the bag type filter. The power consumption when operating the pool cleaner is therefore higher, making it more expensive to operate the pool cleaner.

It is therefore a principal object of this invention to provide an internal filter for an automatic pool-cleaning robot that is both easy to remove/install and easy to clean.

A further object of this invention is to considerably decrease the power consumption of the automatic pool-cleaning robot making it less expensive to operate.

These and other objects will be apparent to those skilled in the art.

SUMMARY OF THE INVENTION

The water filter and water filter assembly for swimming pool cleaning machines of this invention has a hollow outer housing with a top, bottom, and sidewalls. An electrical pump motor is mounted within the outer housing and has an upper end. An output shaft on the pump motor extends upwardly therefrom and has an impeller mounted thereon which is positioned adjacent to and inwardly from a water discharge port in the top of the outer housing. The pump is positioned in spaced relationship with respect to the outer housing.

An opening is located in the bottom of the outer housing to receive a water filter assembly. The filter assembly includes a filter housing which includes space U-shaped ends having top and bottom edges with an open U-shaped opening extending from the top edge and extending downwardly in the U-shaped ends towards the bottom edge thereof. The U-shaped ends have parallel side edges, and a pair of stiff rectangular filter elements are vertically mounted extending between the opposite side edges of the U-shaped ends. A U-shaped housing extends between the U-shaped ends and connects the U-shaped openings in each of the U-shaped ends.

The filter housing has a removable bottom to cover the opening in the bottom of the outer housing. A router inlet port is in the removable bottom. The filter elements extend vertically from the top of the U-shaped housing member and removable bottom member to define a first compartment between the filter elements and the U-shaped housing member. A second compartment is located between the filter elements and the water discharge port.

DESCRIPTION OF THE PREFERRED EMBODIMENT

Figure 1:
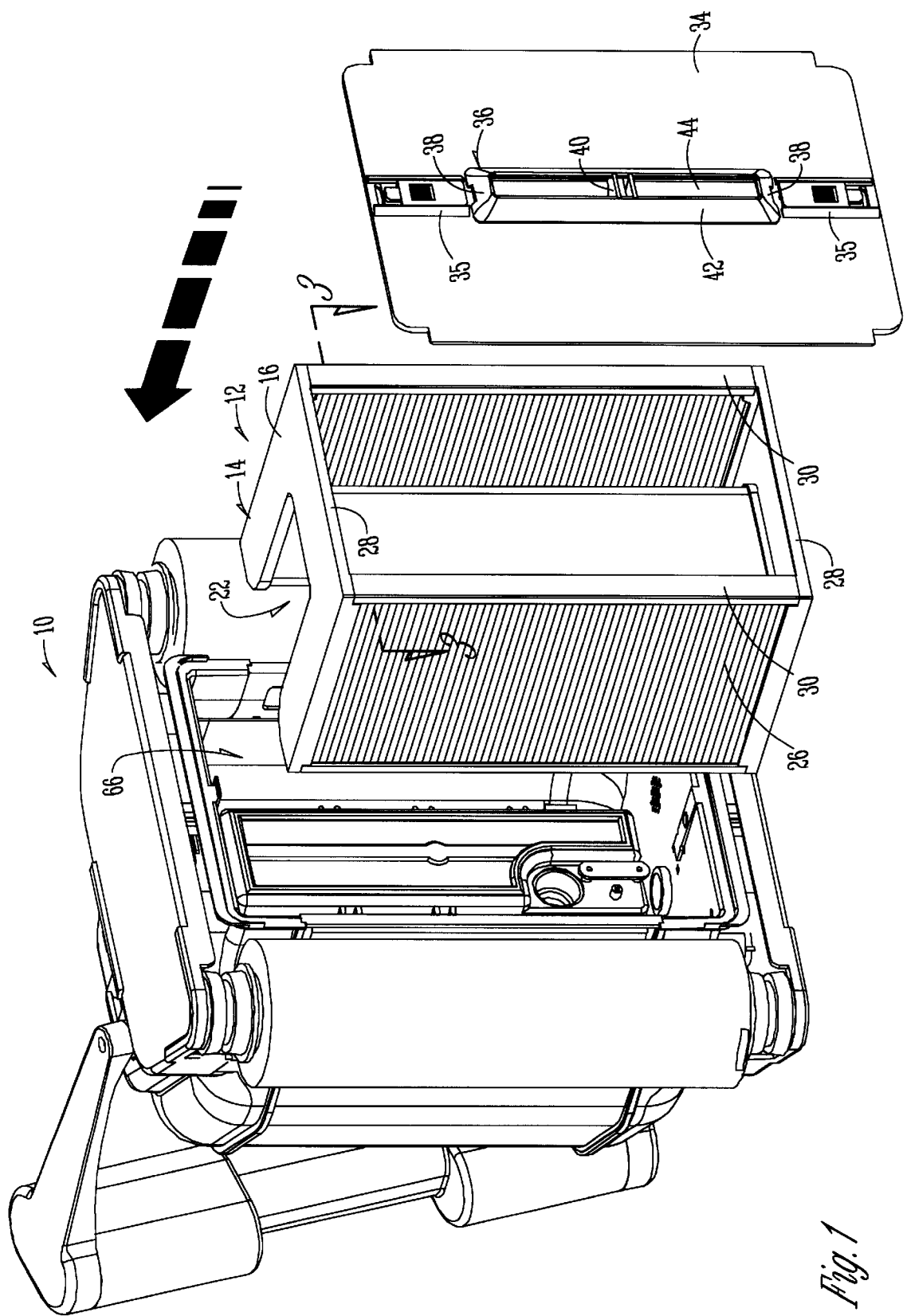
FIG. 1 is a bottom perspective view of the device of this invention.
Figure 2:
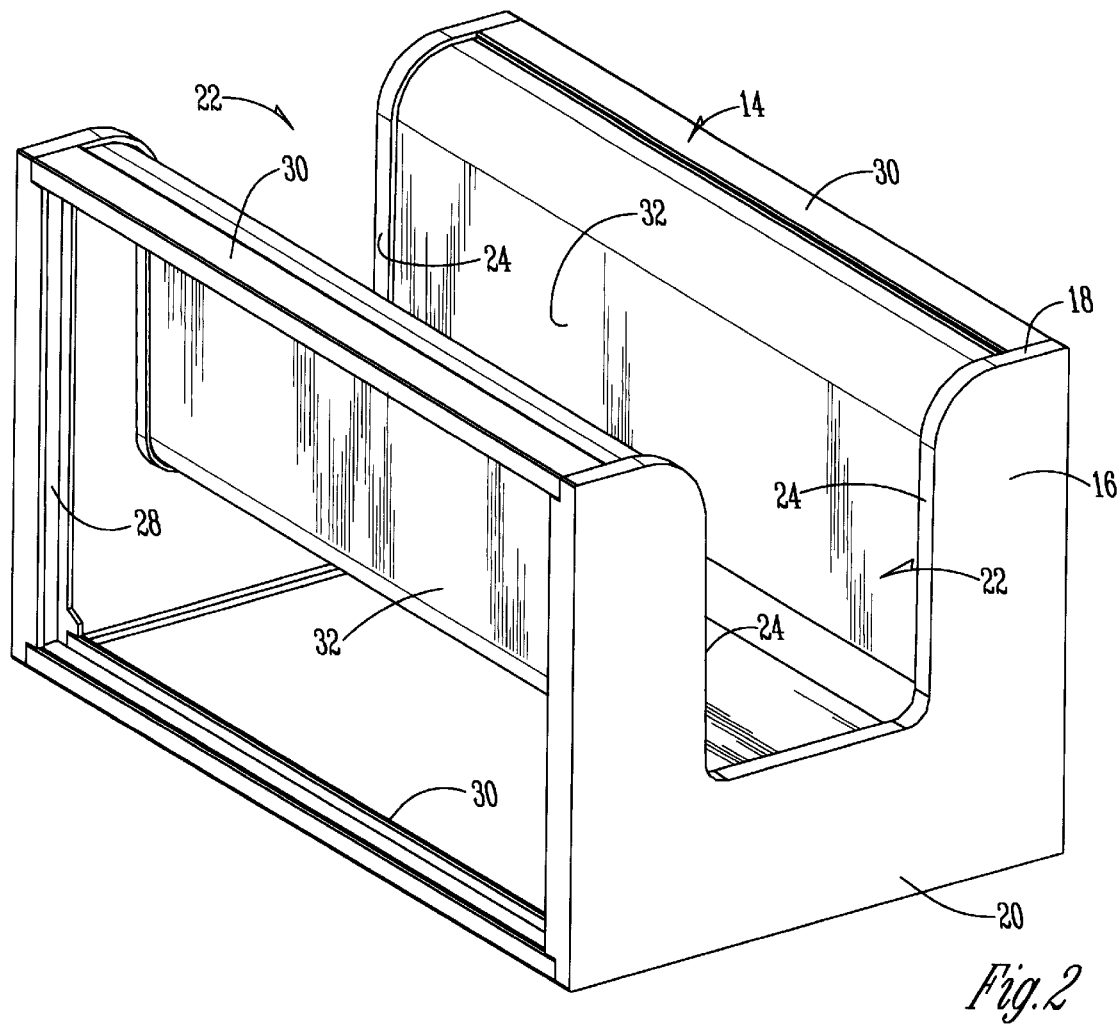
FIG. 2 is an enlarged scale perspective view of the filter assembly without the filter elements being located therein.
Figure 3:
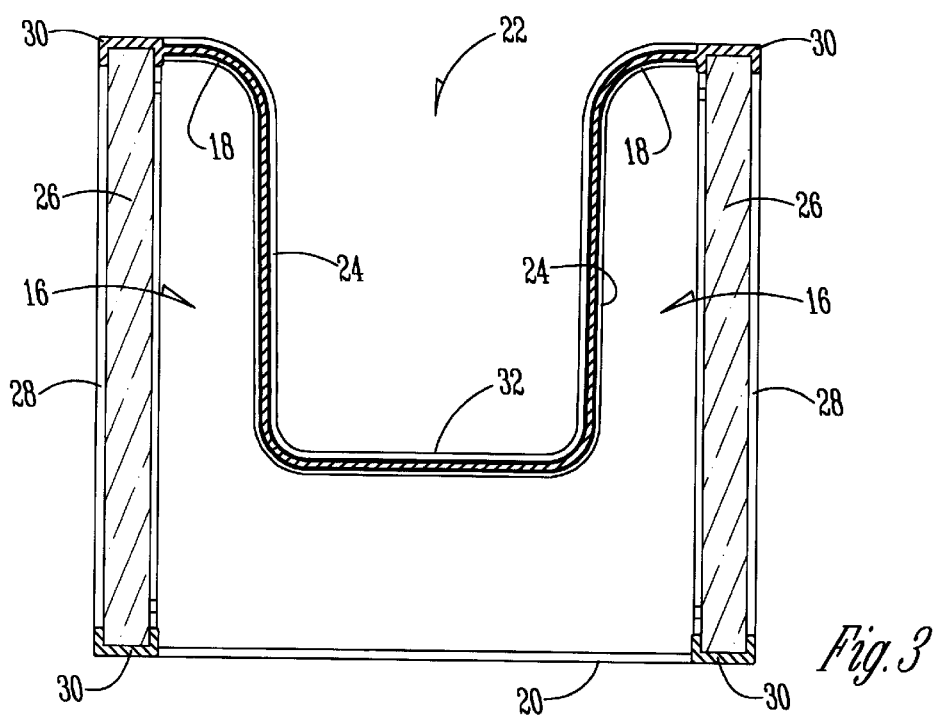
FIG. 3 is a cross sectional view of FIG. 2 with the filter elements being placed therein.

The numeral 10 designates a swimming pool cleaning machine which has a double thickness wall housing 11 which surrounds the filter assembly 12 (FIG. 3). Filter assembly 12 includes a filter housing 14 (FIG. 2). Housing 14 has a pair of spaced U-shaped ends 16 which have top edges 18 and bottom edges 20 (FIG. 2). A downwardly extending U-shaped opening 22 is centrally located in each of the ends 16 (FIGS. 2 and 3). The openings 22 have parallel side edges 24. Filter elements 26 are mounted in vertical channels 28 integrally formed in the ends 16. (FIGS. 1 and 2). Channels 30 connect the opposite upper and lower corners of the ends 16 (FIGS. 2 and 3) and receive the upper and lower edges of the filter elements 26. A U-shaped housing member 32 is mounted in any convenient manner within the U-shaped openings 22 of ends 16 (FIGS. 2 and 3). The filter assembly 12 has a bottom 34 (FIGS. 1 and 4) which is secured in any convenient way such as by slide locks 35 (FIG. 1) to the machine 10. A water inlet port 36 (FIG. 1) has ends 38 and an intermediate support tab 40. Tapered sides 42 on port 36 define an inlet opening 44.

Figure 4:
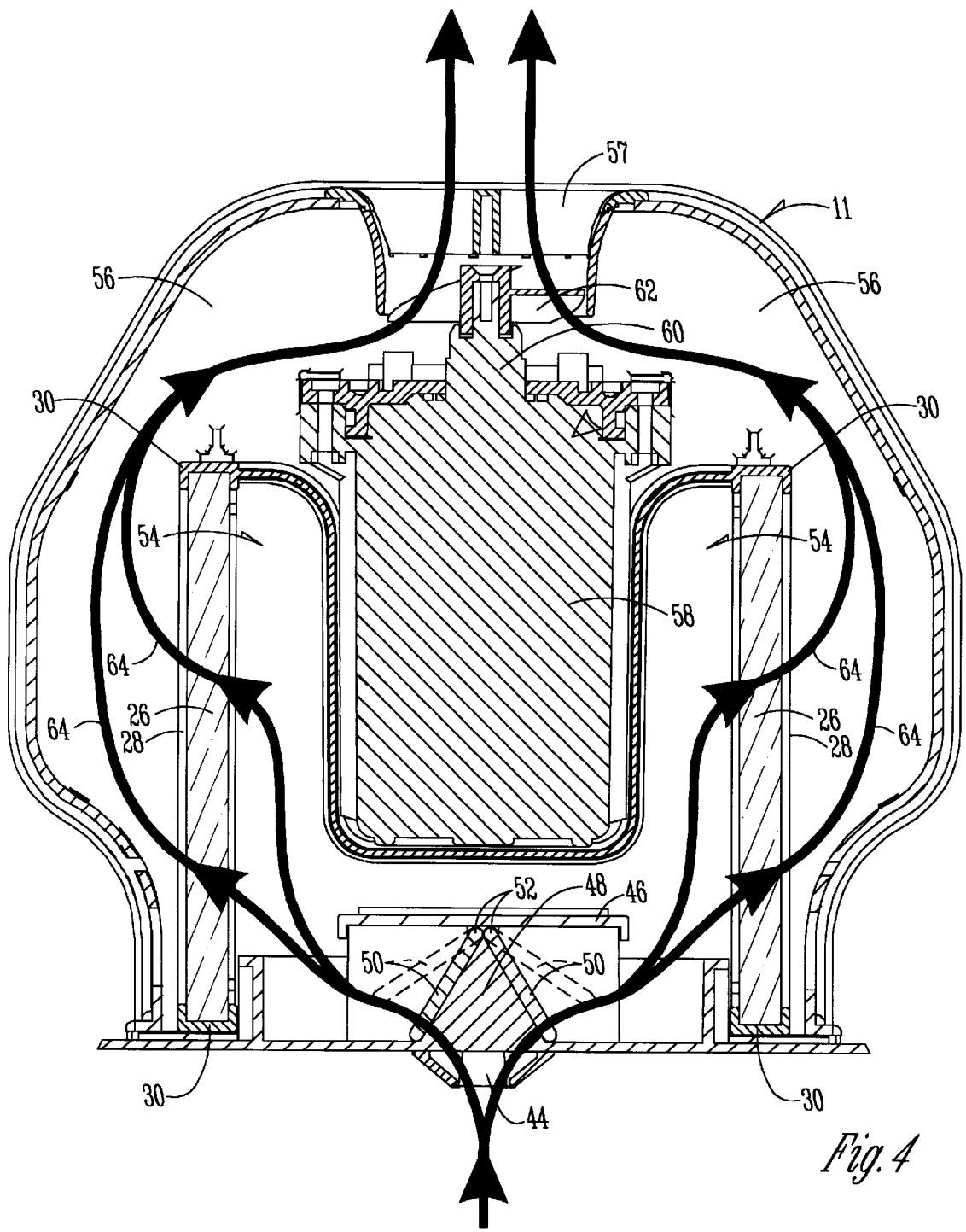
FIG. 4 is a cross sectional view of the assembled components of FIG. 3.

As seen in FIG. 4, an elongated cover plate 46 extends between the ends 16. A thin triangular shaped divider 48 is located in any convenient manner in the center of plate 46. A pair of elongated stiff membranes of rubber or rigid plastic 50 are hinged to the lower central portion of plate 46 and normally rest against the diagonal sides of divider 48 (FIG. 4).

With reference to FIG. 4, a first compartment 54 is located between the inlet 44 and the inner surfaces of filters 26. A second compartment 56 is located between the outer surfaces of filters 26 and the discharge port 57 of the machine 10. An electrical pump 58 is mounted by any convenient means within the U-shaped housing member 32 (FIG. 4). Pump 58 is connected to a source of electrical power (not shown). A shaft 60 extends upwardly out of pump 58 and has a water impeller 62 secured thereto immediately adjacent to the outlet port 57.

The arrows 64 in FIG. 4 illustrate the path of fluid in the swimming pool which bears inlet opening 44 and proceeds into compartment 54, thence through filters 26, and thence through compartment 56 and outwardly through the discharge opening 57. This flow of water is induced by the action of impeller 62.

When water is drawn into compartment 54 by the action of impeller 62, solid material and water from the swimming pool move through port 44 whereupon the membranes 50 are pushed from the position from the solid lines in FIG. 4 to the position the dotted lines. This permits both water and solids in the water to move into the compartment 54. However, the filters 26 prevent the movement of solids 54 through the filters whereupon only the water will pass therethrough, thus confining the solid material to compartment 54. The water passing through filters 26 then is drawn through discharge opening 57 by impeller 62.

The filters 26 are comprised of a pleated permeable cellulose-polyester blend material comprising a substantially stiff texture but which is nevertheless permeable to the swimming pool water. The filters 26 are permanently held within the channels 28 and 30, as previously described, and comprise a substantially rigid configuration with a predetermined shape. Thus, the filter assembly of FIG. 3, with the bottom 34 in place, contains all the solid debris that has been moved to compartment 54 but which cannot move through the filter elements 26. By disengaging slide lock 35, the filter assembly can be slidably removed from the interior 66 (FIG. 1) of the machine 10 much like a waste basket. The spray from a common garden hose is used to remove the debris from compartment 54 when the filter assembly 12 is removed from the machine 10, and the bottom 34 has been removed from the filter housing 14.

The pleated permeable cellulose/polyester blend material of filters 26 which entrap the debris, as discussed above, is of considerably higher permeability than the polyester yarn material used in a bag type filter of prior art. Testing has shown that a robot-type design using this type of filter element consumes over 30% less power than those machines using a bag-type filter.

From the foregoing, it is seen that this invention would at least achieve all of its stated objectives.

What is claimed is:

1. A water filter assembly for an underwater swimming pool cleaning machine, comprising, an elongated filter housing a pair of longitudinally spaced U-shaped ends having top and bottom edges with an open U-shaped opening extending from the top edge and extending downwardly in the U-shaped ends towards the bottom edge and terminating above the bottom edge, the U-shaped ends having parallel side edges, a pair of stiff rectangular filter elements vertically mounted and extending between opposite side edges of the U-shaped ends, a U-shaped housing member extending between said U-shaped ends and connecting the U-shaped openings in each of U-shaped ends.

2. The assembly of claim 1 wherein the filter housing has a removable bottom, a water inlet port in the removable bottom, a pair of elongated flaps normally closable on each other and positioned over the inlet port.

3. A filter system for an underwater swimming pool cleaning machine, comprising, a hollow outer housing having a top, a bottom and sidewalls, an electrical pump motor mounted within the outer housing and having an upper end, an output shaft on the pump motor and extending upwardly therefrom, an impeller mounted on the output shaft and being positioned adjacent to and inwardly from a water discharge port in the top of the outer housing, the pump being positioned in spaced relationship with respect to the outer housing, an opening in the bottom of the outer housing to receive a water filter assembly, the filter assembly including a filter housing, the filter housing including a pair of longitudinally spaced U-shaped ends having top and bottom edges with an open U-shaped opening extending from the top edge and extending downwardly in the U-shaped ends towards the bottom edge and terminating above the bottom edge, the U-shaped ends having parallel side edges, a pair of stiff rectangular filter elements vertically mounted and extending between opposite side edges of the U-shaped ends, a U-shaped housing member extending between said U-shaped ends and connecting the U-shaped openings in each of U-shaped ends, the filter housing having a removable bottom to cover the opening in the bottom of the outer housing, a water inlet port in the removable bottom, the filter elements extending vertically from the top of the U-shaped housing member and the removable bottom member to define a first compartment between the filter elements and the U-shaped housing member, and a second compartment between the filter elements and the water discharge port, whereby water drawn into the outer housing through the water inlet port will enter the first compartment, flow through the filter elements, and thence into the second compartment and outward through the water discharge port, to permit the filter elements to confine solids in the water entering the outer housing to be confined to the first compartment.

\* \* \* \* \*